United States Patent [19]

Beinhaur

[11] Patent Number: 4,828,351
[45] Date of Patent: May 9, 1989

[54] POWDERED METAL CONNECTOR
[75] Inventor: Ernest L. Beinhaur, Harrisburg, Pa.
[73] Assignee: AMP Incorporated, Harrisburg, Pa.
[21] Appl. No.: 190,861
[22] Filed: May 6, 1988
[51] Int. Cl.[4] .......................... H01R 4/00; H01R 4/10
[52] U.S. Cl. ................................. 350/96.20; 439/874; 439/879
[58] Field of Search ................. 29/857, 860, 861, 520; 174/94 R; 403/282, 284; 439/874, 875, 877, 879, 880; 350/96.20, 96.21

[56] References Cited
U.S. PATENT DOCUMENTS

Re. 25,698 12/1964 Cobaugh .
1,030,321  6/1912 Muller ..................................... 29/520
2,007,352  7/1935 Stevens ................................ 439/695
3,052,750  9/1962 Cobaugh .
3,125,630  3/1964 Wahl .
3,340,351  9/1967 Tiernan, Jr. ........................... 174/79
3,588,982  6/1971 Ziegler, Jr. .
3,624,679 11/1971 Ziegler, Jr. .
3,798,348  3/1974 van Toorn ......................... 174/84 S
4,440,469  4/1984 Schumacher ....................... 350/96.2
4,457,737  7/1984 Sharples ................................ 29/520

FOREIGN PATENT DOCUMENTS 162523  3/1958 Sweden ................................ 29/520

Primary Examiner—Gary F. Paumen
Attorney, Agent, or Firm—Bruce J. Wolstoncroft

[57] ABSTRACT

A powdered metal insert (2) is disclosed for use with a fiber optic cable (16) or a wire (60). The insert (2) is positioned in a connector with the cable positioned along the longitudinal axis of the insert. Termination of the insert to the cable occurs as a force is applied to the insert in a direction which is parallel to the longitudinal axis of the insert. This longitudinal force results in an evenly distributed transverse force being applied to the cable and the connector. This even distribution of forces along the cable can be easily and accurately controlled so that the powdered metal insert (2) can be used effectively to provide the mechanical connection required for the fiber optic cable (16) as well as to effectively provide the mechanical and electrical connection of the stranded wire.

6 Claims, 4 Drawing Sheets

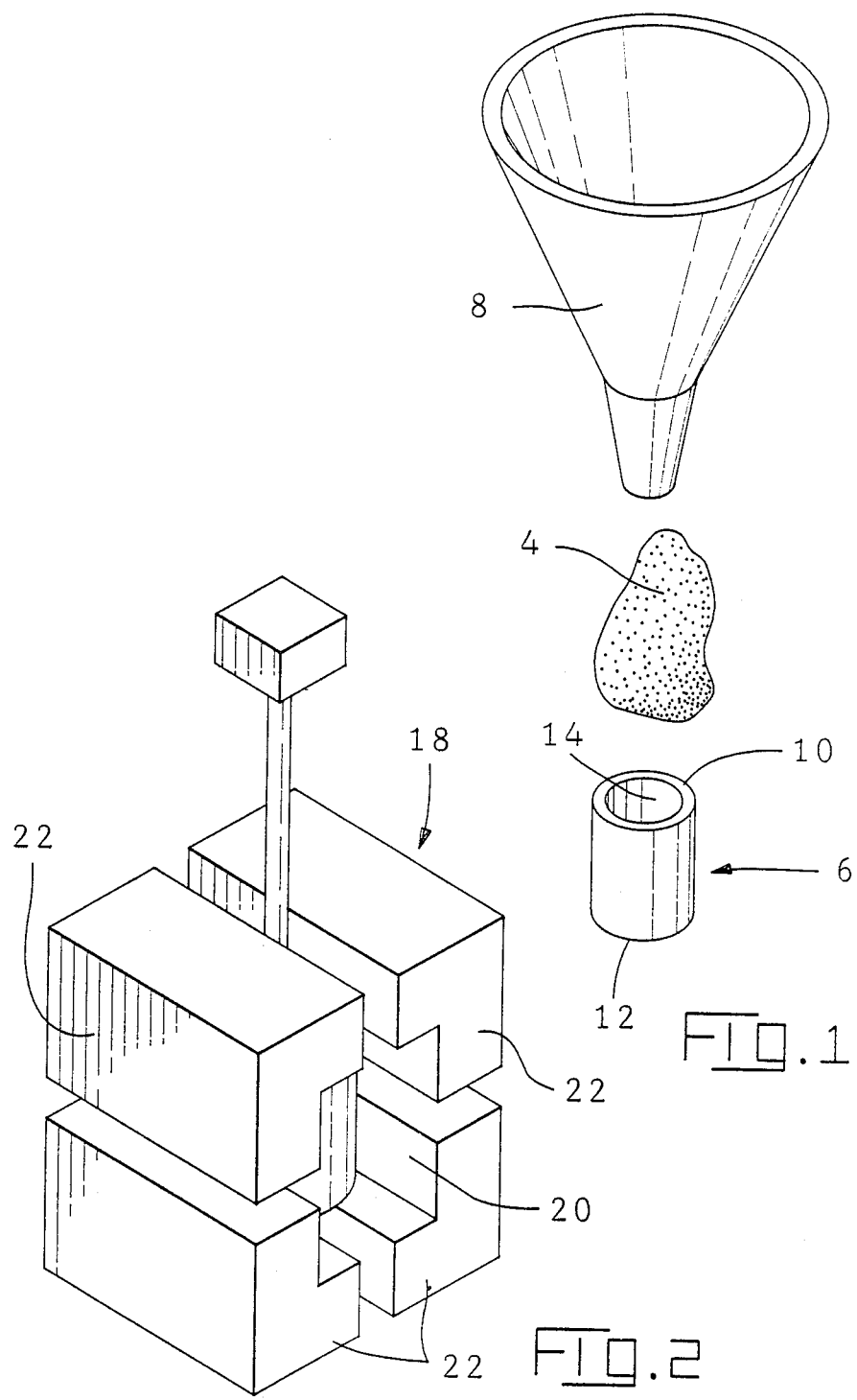

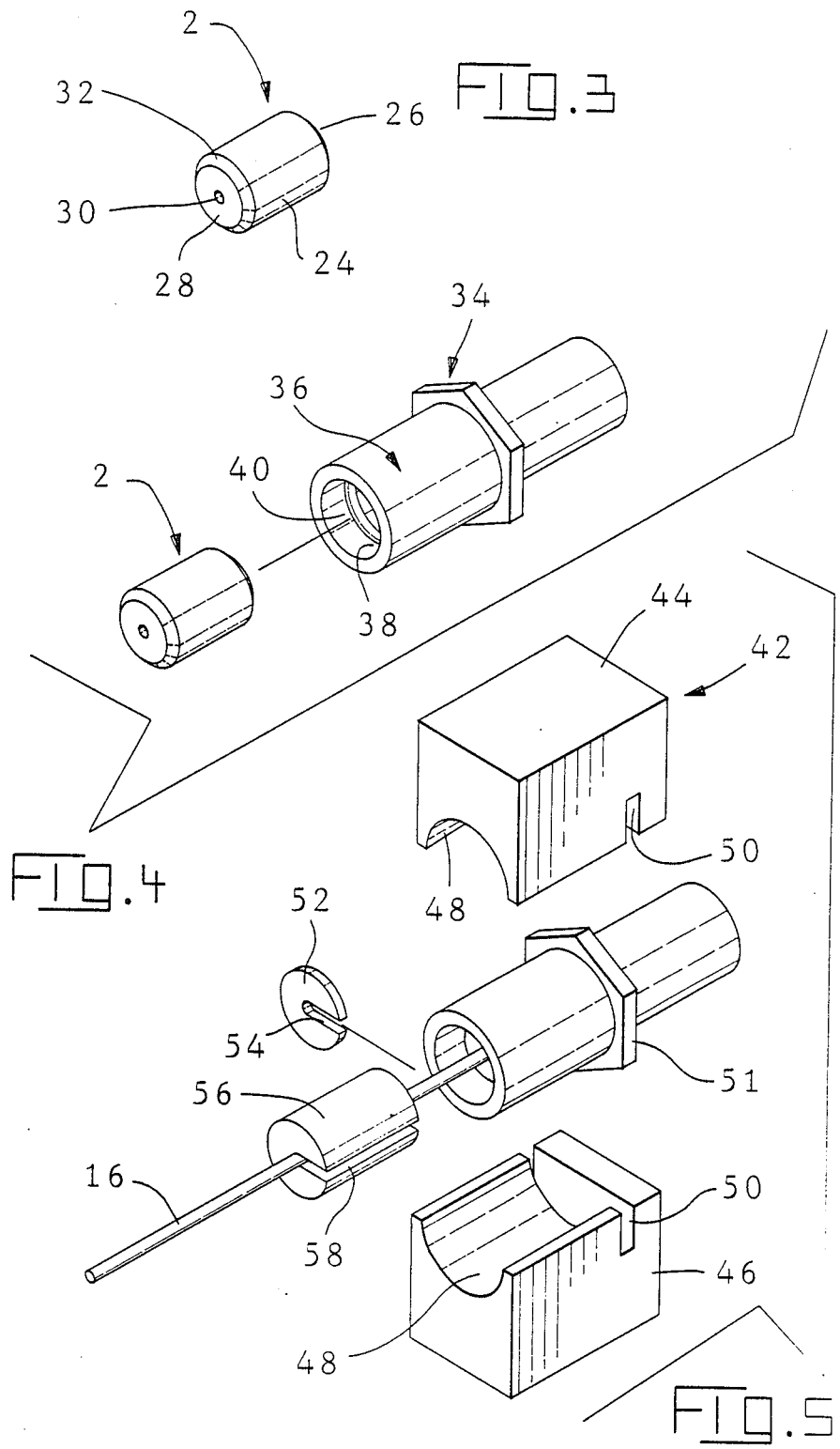

POWDERED METAL CONNECTOR

FIELD OF THE INVENTION

The invention is directed to a powdered metal connector which is axially crimped to the cable or the like. In particular, the invention is directed to a powdered metal connector which distributes forces evenly about the circumference of the cable or the like.

BACKGROUND OF THE INVENTION

For purposes of discussion, the prior art connectors will be divided into two groups. The first group includes crimpable connectors for use with electrical wires and the like, and the second group relates to fiber optic connectors.

In the prior art there are many different crimpable terminals. The majority of these prior art crimp type terminals utilize a metal barrel into which the end of a wire is positioned. The metal barrel is then crimped around the wire, making both an electrical connection and a mechanical connection therebetween. Serrations are sometime provided on the barrel, and generally extend circumferentially around the barrel, although other configurations are possible. The serrations are provided to enhance the mechanical and electrical characteristics of the connection.

The crimp type barrel terminals are acceptable in many applications, however when large gauge wires are to be crimped, problems arise. In order to accommodate the large gauge wires, a large mass of material is required for the barrels. Consequently, the crimping operation becomes difficult and unreliable. Also, heavy gauge metal is generally not required for the other portions of the terminals. Accordingly, considerably more material is utilized in the manufacturing of such heavy gauge terminals than is needed. In the alternative, if the thickness of the barrel portions are reduced to the thickness required for the other portions of the terminals, then the heavy gauge wire will not be properly retained within the crimped barrels.

Another common problem with barrel terminals, is the range of wire sizes with which any given barrel size can be used. In most barrel terminals, only a range of two or three gauges of wire can be crimped effectively. If the barrel is too small, the wire is not properly retained, and if the barrel is too large, the wire does not fill up a sufficient amount of the barrel cavity to provide the required electrical contact and mechanical tensile strength. More specifically, in the case where the wire is too large for the barrel, the barrel tends to relax excessively, thereby reducing the effectiveness of the electrical contact as well as reducing the tensile strength. Consequently, any given barrel terminal is generally limited to a small range of wire sizes.

Also, in the case of barrel terminals, air and other corrosive elements can react with the barrel and the exposed wire to cause corrosion and the like. This corrosion decreases the effectiveness of the electrical connection between the barrel and the wire, as well as reducing the tensile strength therebetween.

Still another problem encountered with conventional barrel terminals is directly attributable to the relatively large crimping force required in order to extrude large gauge wires and stranded wires so that a good electrical and mechanical connection is made therein. In many case this relatively large crimping force precludes the crimping of the barrel which have had plastic sleeves placed thereover. In such cases, crimping must be done before the plastic sleeve is placed over the terminal, which requires an extra manufacturing step.

As was stated, the second group of connectors relates to fiber optic connectors. There are many fiber optic connectors available in the market place. Since the development of the art of transmitting light through fine fibers of glass and plastic material there has been a constant search for satisfactory methods and devices for splicing and coupling the fibers. Such methods and devices have encountered many substantial problems including both the light loss at the connection points as well as the difficulty in working with the extremely fine fibers.

Because of the extremely small dimensions of the light transmitting fibers, it has been more common to connect bundles of cable made up of a plurality of individual fibers. In such cases it is not necessary to have a one-to-one alignment of the individual fibers. However, the bundle must be placed in such position that there will be a substantial amount of light transmitted from cable to cable without an unacceptable loss of light.

Unacceptable light transmission across splices occurs for several reasons. As stated above one reason for light loss is due to the misalignment of the fibers. However, another source of light loss is caused by damage to the fibers. This damage is a result of uneven forces being exerted on the fibers. This causes an uneven deformation of the fibers, which results in light being deflected away from the axis of the fiber. Consequently, inadequate light is transmitted, causing a system failure. This is an unacceptable result.

SUMMARY OF THE INVENTION

The invention is directed to a deformable insert which can be used to terminate a fiber optic cable, as well as stranded wire. The invention is further directed to a method of applying the deformable insert to the cable or wire.

An electrical connector is described which has a conductor receiving portion. The conductor receiving portion has a first end and a second end. An opening is provided in the conductor receiving portion and extends from the first end toward the second end, the opening has opening sidewalls.

A deformable insert, dimensioned such that the diameter of the insert is less than the diameter of the opening, is positioned in the opening of the conductor receiving portion. The insert has an aperture provided therein which is positioned along the longitudinal axis of the insert. The aperture is dimensioned to receive a conductor therein.

As an axial force is applied to the insert, the insert is caused to compress in the axial direction and expand in a direction which is normal to the axis of the insert. Consequently, as the axial force is applied, the insert is caused to deform normally of the axis in such a manner as to insure that the normal forces applied to the conductor receiving portion and the conductor are evenly distributed along the axis of the insert.

A method for crimping a connector to a conductor in a manner which does not damage the connector or the conductor is also described. The method is comprised of several steps. A deformable insert is positioned in an opening of the connector. The conductor is then positioned in an opening of the deformable insert With the insert and conductor properly positioned, a force is applied to an end of the insert. This force is applied in a direction which is parallel to the axis of the insert.

The insert is then deformed, such that the insert is compressed in the axial direction. This compression caused the insert to expand in the direction which is normal to the axis of the insert, causing the insert to be forced against the walls of the opening of the connector and against the surface of the conductor. The force applied by the insert on the walls of the connector and the surface of the conductor are applied evenly over the entire length of the insert, thereby preventing the forces from damaging the conductor.

The deformable insert which connects a conductor with a connector comprises a cylindrical member which has a side wall, a first end wall, and a second end wall. An opening is provided in the cylindrical member. The opening extends from the first end wall toward the second end wall, along the longitudinal axis of the insert. The dimensions of the opening are such to allow a respective conductor to be inserted therein.

The insert is constructed of material having the deformable characteristics required As a force is applied to the first end of the insert, the insert will be compressed in the direction of the axis of the insert. This longitudinal compression will cause the insert to expand in the direction which is normal to the axis of the insert, thereby allowing an axial force to be translated into a normal force on the conductor. The normal force is distributed evenly over the length of the insert.

BRIEF DESCRIPTION OF THE DRAWINGS

FIG. 1 is a perspective view showing powdered metal material being positioned is a form.

FIG. 2 is a perspective view of an apparatus which initially compresses the powdered metal material to form a powdered metal insert.

FIG. 3 is a perspective view of the powdered metal insert of the present invention.

FIG. 4 is a perspective view of the powdered metal insert prior to being inserted into a fiber optic connector.

FIG. 5 is a perspective view of the fiber optic connector with the insert positioned therein, the tooling required for termination of cable to the connector is exploded therefrom.

DETAILED DESCRIPTION OF THE INVENTION

Figure 6:
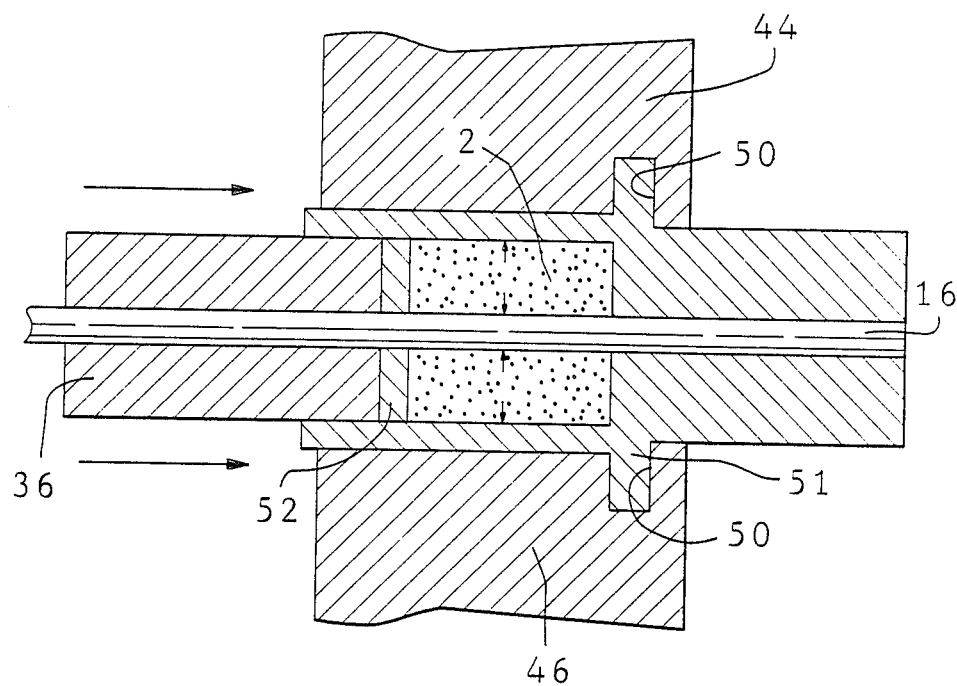
FIG. 6 is a cross-sectional view indicating how forces are distributed as the tooling of FIG. 5 cooperates with the insert.

The connector described herein can be used for several purposes. Therefore, for ease of explanation and understanding, the discussion will be divided into two sections The first section will describe the use of the connector with conductors such as fiber optic cable, and the second section will explain the connector when it is used with a stranded electrical wire or the like.

When terminating a fiber optic cable, it is extremely important that the cable be undamaged. If damage occurs to the fiber optic cable, the light which is carried therethrough will be obstructed. This will cause information to be lost or wrong information to be transmitted along the cable. Damaging the cable can occur in many ways, but perhaps the most common cause of damage to a fiber optic cable occurs when forces are applied to the cable in order for the cable to be terminated, i.e. crimp forces. In order to prevent the cable from being damaged, expensive and complicated connectors have been design to terminate the fiber optic cable in ways which do not utilize crimp technology. However, these connectors can be costly and complicated to use. As an example, typical fiber optic connectors require heat to be used in order for the fiber optic cable to be secured This can be cumbersome, particularly in field conditions.

The present invention is directed to a terminal which prevents damage to the fiber optic cable as termination occurs. A deformable insert 2 is provided, the insert minimizes the problems discussed above, and provides a easy and effective means to terminate the fiber optic cable without damaging the cable. Insert 2 is made of powder metal or some other material which has the characteristics required.

Before describing how insert 2 cooperates with a fiber optic cable 16, it is thought helpful to describe the process by which the insert is made. As shown in FIG. 1, powdered metal material 4 is positioned in a cylindrical member 6 by means of a funnel 8 or the like. Cylindrical member 6 has a first end surface 1 and a second end surface 12. An opening 14 extends from first end surface 10 to proximate second end surface 12. Powdered metal material 4 is positioned in opening 14 of member 6.

With powdered metal material 4 properly positioned in opening 14 of member 6, member 6 is placed in apparatus 18. An aperture 20 is provided to receive member 6 therein. The dimensions of aperture 20 are larger than the dimension of member 6, thereby allowing for the easy insertion of member 6 into aperture 20. Once member 6 is inserted into aperture 20, clamping portions 22 of apparatus 18 are moved toward member 6. This movement is continued until clamping portions 22 are in engagement with member 6, thereby holding member 6 in aperture 20.

With member 6 properly secured in apparatus 18, a spacer (not shown) is inserted into the powdered metal material 4. The spacer is inserted through end !0, along the axis of opening 14 of member 6. This spacer forms an opening in the center of powdered metal material 4. It should be noted that the spacer extends from end 10 through end 12.

With spacer properly positioned, a ram is advanced to engage powdered metal material 4. The ram initially engages the material provided proximate end 10. The ram continues to advance into opening 14 of member 6, thereby causing powdered metal material 4 to be compressed. Enough force is applied by ram to powder metal material 4 to compress the material is such a manner so that the individual particles are bonded together to form insert 2. After the appropriate force has been applied to powdered metal material 4, the ram and spacer are retracted. The clamping portions 22 are then moved away from member 6, allowing member 6 to be removed from aperture 22. The formed insert 2 is then removed from member 6.

As shown in FIG. 3, insert 2 has a cylindrical outer wall 24 and oppositely facing end walls 26, 28. An aperture 30 extends from end wall 26 to end wall 28. When viewed in cross-section, the center of aperture 30 is identical to the center of cylindrical insert 2. Aperture 30 is dimensioned to receive fiber optic cable 16 therein. It should be noted that the diameter of both outer wall 24 and aperture 30 can vary according to the particular application. As is shown in FIGS. 3 and 4, ends 26, 28 can be provided with tapered surfaces 32 which act as lead-in surfaces when insert 2 is positioned in a connector 34.

The configuration of connector 34 can vary according to the interconnection to be made, however various aspects of connector 34 will be common. As shown in FIGS. 4 and 5, connector 34 has a first conductor receiving end 36 which has an opening 38 provided therein, and a second conductor receiving end 37. Opening 38 is dimensioned to allow insert 2 to be inserted therein. Ribs 40 are provided on the cylindrical inner wall of opening 38. It should be noted that ridges 40 are not required.

With insert 2 positioned in opening 38 of connector 34, fiber optic cable 16 is inserted into opening 30 of insert 2. The diameter of opening 30 is such to allow for the easy insertion of fiber optic cable 16 therein, while still providing a type of alignment means to insure that the cable is properly positioned.

FIG. 5 illustrates insert 2 and cable 16 inserted in opening 38 of connector 34. However, the positioning does not provide the mechanical connection required to insure that insert 2 and cable 16 will be maintained in position when the connector is place in operation. Therefore, insert 2 must be secured to connector 34 and cable 16.

As shown in FIG. 5, connector 34 is placed in a holder 42 which is comprised of an upper half 44 and lower half 46. The holder is positioned about connector 34, such that holder 42 prevents connector 34 from movement. In the particular example illustrated in FIG. 5, each half 44, 46 has a cylindrical receiving surface 48 which cooperates with the conductor receiving portion 36 of connector 34. A slot 50 is provided at an end of cylindrical receiving surface 48, the slot cooperates with a shoulder 51 of connector 34. The cooperation of shoulder 51 and slots 50 insures that connector 34 will not be moved in the longitudinal direction with respect to holder 42.

With connector 34 secured in holder 42 a cover 52 is positioned in alignment with opening 38 of connector 34. Cover 52 has a slot 54 which extends from an edge of the cover to proximate the center of the cover. Slot 54 allows cover to be inserted into alignment opening 38 without interfering with cable 16. Cover 52 is dimensioned slightly larger than opening 38, such that as cover 52 is forced into position, as will be described, cover 52 frictionally engages the side surfaces of opening 38.

With cover 52 positioned in opening 38, a ram 56 is moved into alignment with opening 38, as is shown in FIG. 5. Ram 56 has a slot 58 which extends along the length of the ram. Slot 58 is provided to allow ram 56 to be positioned in alignment with opening 38 without interfering with cable 16. It should be noted that the cross-sectional diameter of ram 56 is slightly less than the cross-sections diameter of opening 38.

After ram 56 is positioned in alignment with opening 38, ram 56 is forced to move toward opening 38. This causes ram 56 to engage cover 52 and force cover 52 to move into opening 38. As the motion is continued, cover 52 engages insert 2. The advancement of ram 56, which is in a direction along the axis of insert 2, causes the powdered metal material of insert 2 to compress, as the powdered metal is constricted from movement in all directions. Consequently, as this axial motion of ram 56 continues, the powdered metal is forced against the side walls of opening 38 and against the fiber optic cable 16. The transverse forces applied by the powdered metal to the side walls of opening 38 and to the fiber optic cable 16 will be evenly distributed over the entire length of insert 2. This even distribution of forces in the transverse direction is a result of the driving force being applied in the longitudinal direction.

The transverse distribution of forces insures that the powdered metal insert 2 will cooperate with the side walls of opening 38 to provide the mechanical connection necessary to maintain insert 2 and cable 16 in opening 38. Ribs 40 also provide an added insurance that the insert 2 will be maintained in position. Powdered metal will flow into ribs 40 as the axial force in applied to the insert 2, providing extra mechanical support.

The axial crimping force is extremely important in order for an effective connection of fiber optic cable 16. As stated, the axial force applied by ram 56 is translated into a evenly distributed transverse force applied to cable 16. This evenly distributed force insures that the alignment of the cable will not be altered. As the force is applied evenly from all directions, the alignment of cable 16 will remain unchanged.

The even distribution of forces also insures that the fiber optic cable will not be unevenly deformed as the mechanical process of securing the cable in the insert occurs. As ram 56 is advanced, the forces applied to cable 16 are equal and opposing along the length of the insert. This distribution of forces insures that no one point of fiber optic cable 16 will experience more force than any other point on the cable.

The uniform distribution of forces also has the advantage of being predictable and repeatable. This is extremely important, particularly when terminating fiber optic cable. As the forces which are applied to cable 16 are uniform, the forces can be easily predicted in relationship to the movement of ram 16. Therefore, the amount ram 16 must be moved in order to secure cable 16 in insert 2 is easily predicted and is repeatable. In other words, the movement of ram 56 is controlled to insure that the proper force is applied to cable 16 to provide the mechanical securing without damaging the cable. Consequently, no distortion or loss of information transmitted on the cable will occur.

When cable 16 is secured in insert 2, and insert 2 is secured in opening 38, the forward motion of ram 56 is discontinued. Ram 56 is then withdrawn and removed from opening 38. Holder 42 is then removed from connector 34.

It should be noted that as ram 56 is inserted into opening 38, cover 52 is forced inward accordingly. As ram 56 is withdrawn, the frictional engagement between the side walls of opening 38 and cover 52 cause the cover to remain in opening 38. This retention of cover 52 in opening 38 insures that the forces applied by the powdered metal insert 2 will be maintained against cable 16 and side walls of opening 38. The force is maintained because cover maintains the powdered metal in the confined area.

The same type of operation described for the termination of fiber optic cable is also important for the termination of conventional wire, whether stranded or not.

Figure 7:
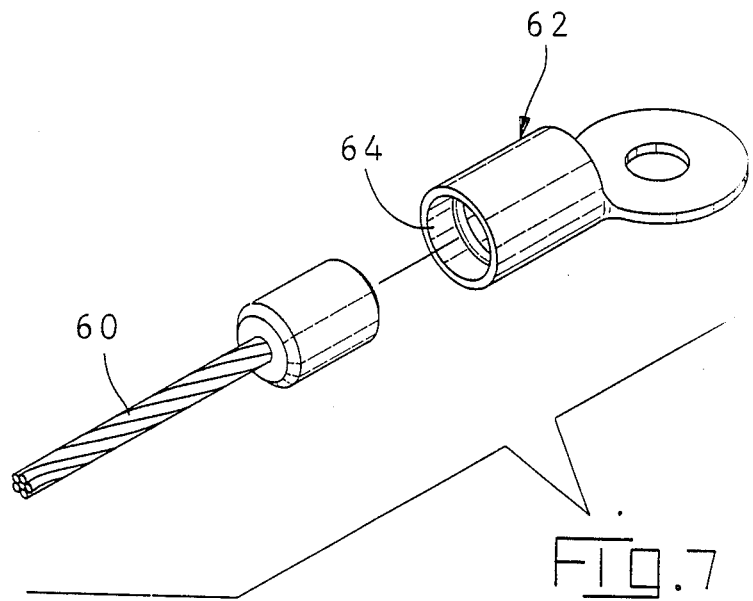
FIG. 7 is a perspective view of the powdered metal insert prior to being inserted into a terminal.
Figure 8:
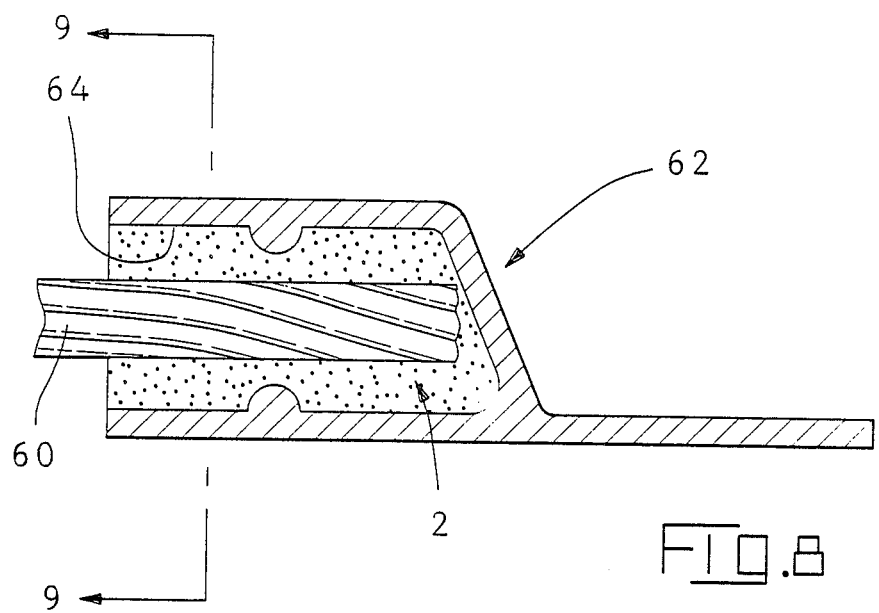
FIG. 8 is a cross-sectional view showing the flow of the powdered metal in the terminal of FIG. 8 when compressive forces are applied thereto.
Figure 9:
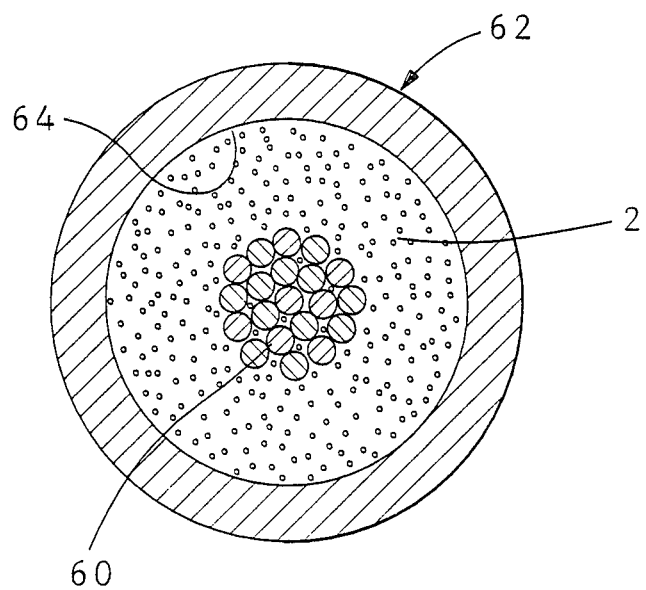
FIG. 9 is a cross-sectional view showing the cooperation of the powdered metal insert with stranded wire.

As shown in FIGS. 7 through 9, powdered metal insert 2 can be used to terminate a wire 60 to a terminal 62. The insert is manufactured in the same manner, and the process used to terminate the conductors is essentially identical to that described above. It is therefore deemed unnecessary to again describe the process in detail. However, several features do vary, and will be described below.

When terminating wire 60 to terminal 62 it is important to provide a reliable, effective mechanical connection. However, it is also extremely important to provide a reliable, effective electrical connection. In order for a reliable electrical connection to be effected, it is important that the powdered metal actually penetrate the wire. To accomplish this, ram 56 must be advanced further into opening 64 than is required above. This will cause the powdered metal to be compressed further, causing the transverse forces to be stronger. These increased transverse forces will penetrate wire 60, placing the powdered metal in electrical engagement with wire 60. This increased force also insures that the powdered metal will penetrate any oxides which are present on wire 60.

Providing an electrical connection between terminal 62 and wire 60 is particularly difficult if wire 60 is stranded. It is difficult in conventional type crimping connectors to electrically engage all the various strands of wires when an electrical connection is to be performed. However, with the use of powdered metal insert 2, this problem is essentially eliminated.

As the powdered metal is compressed, the powdered metal "flows" to fill all voids in the opening. This motion of the powdered metal insures that the powdered metal will move between the individual wires of the stranded wire, thereby providing the electrical path required to each individual wire of the stranded wire.

A controlled "flow" of the powdered metal is beneficial no matter what type of cable or wire is being terminated. The motion of the powdered metal fills the voids which are present in the opening. Consequently, as no voids are present after termination, air and other corrosive matter will not infiltrate the connection. Therefore, the use of powdered metal provides for a much more reliable interconnection over time. This applies to fiber optic cable termination as well as to stranded wire termination.

As can be seen from the discussions above, the use of a powdered metal insert for the termination of cable and wire has many advantages. The even distribution of forces allows the behavior of the inserts to be predictable, thereby allowing the insert to be used in the termination of fiber optic cable. The "flowable" nature of the powdered metal inserts also allows for the effective use of the inserts with wire or stranded wire. Therefore, the same insert is equally well adaptable for the termination of fiber optic cable and stranded wire. Thus, only one insert need be produced for a variety of tasks, thereby greatly reducing the cost of manufacture.

Another advantage of the powdered metal insert is the ease of installation. It is important, particularly in field applications, that the connector be easily applied to the fiber optic cable or wire. The present invention meets these requirements. No complicated tools are required.

Changes in construction will occur to those skilled in the art and various apparently different modifications and embodiments may be made without departing from the scope of the invention. The matter set forth in the foregoing description and accompanying drawings is offered by way of illustration only.

I claim:

1. A terminating member comprising:
   a cable receiving portion having a first end and a second end, an opening provided in the cable receiving portion and extending from the first end toward the second end, the opening having opening sidewalls;
   a deformable insert having a first surface, a second surface, and a side surface extending therebetween, the insert positioned in the opening of the cable receiving portion, the insert having an aperture provided therein, the aperture being positioned along the longitudinal axis of the insert and receiving a fiber optic cable therein;
   whereby a force is applied to the first surface of the insert, in the direction of the longitudinal axis of the insert, causing the deformable insert to provide a uniformly distributed force on the sidewalls of the opening and on the cable provided in the aperture.

2. A terminating member as recited in claim 1 wherein the deformable insert is dimensioned such that the diameter of the insert is less than the diameter of the opening.

3. A terminating member is recited in claim 1 wherein the deformable insert is formed of powdered metal material.

4. A terminating member as recited in claim 3 wherein the transverse force applied to the fiber optic cable is of sufficient force for the powdered metal to cooperate with the fiber optic cable to effective a mechanical connection between the insert and the fiber optic cable, without causing deformation to the fiber optic cable.

5. A terminating member as recited in claim 3 wherein the cable receiving section has ribs which extend about the perimeter of the conductor receiving section, the ribs cooperate with the powdered metal to maintain the deformable insert in the opening of the cable receiving section.

6. A terminating member as recited in claim 1 wherein a cover is provided in the opening, the cover cooperates with the sidewalls of the opening to maintain the deformable insert in the opening.

* * * * *